Jan. 21, 1947.  A. VANG  2,414,494
METHOD AND APPARATUS FOR CARBURETION
Filed Sept. 23, 1942
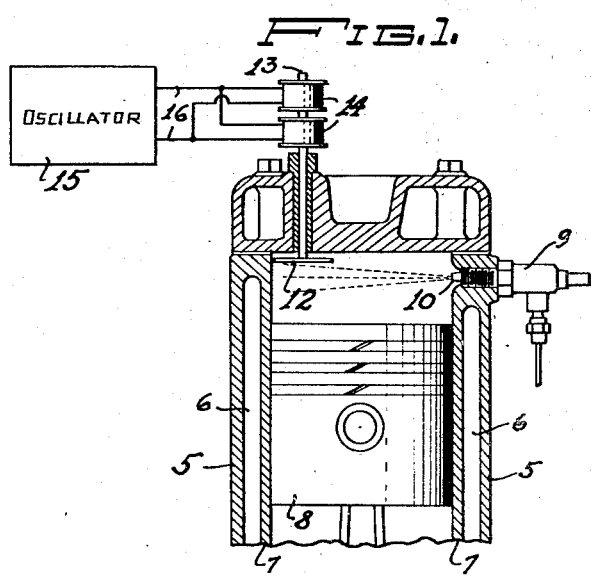
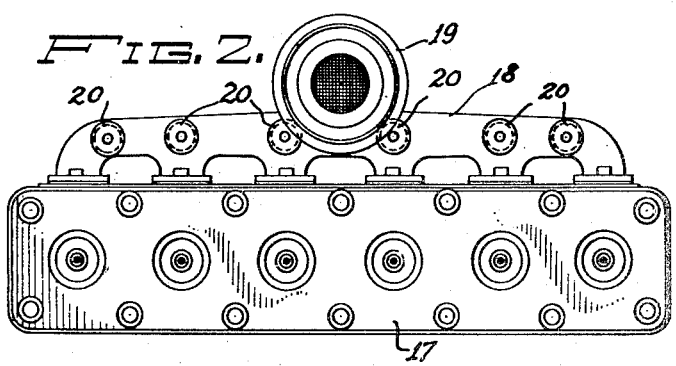
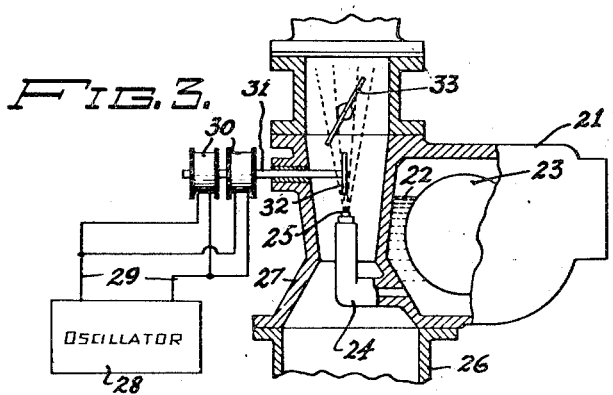
Alfred Vang
INVENTOR.
BY Peter M. Boesen
ATTORNEY.

Patented Jan. 21, 1947

2,414,494

UNITED STATES PATENT OFFICE 2,414,494

METHOD AND APPARATUS FOR CARBURATION

Alfred Vang, Newark, N. J.

Application September 23, 1942, Serial No. 459,387

11 Claims. (Cl. 261—1)

This invention relates to a new method and apparatus for atomizing fuel and mixing the same intimately with air, and more particularly carbureting the combustion supporting air of combustion engines with fuel particles in a highly dispersed state.

It is the general object of the invention to provide a method and apparatus whereby highly efficient mixing of air and fuel is acomplished with the aid of forced vibrations or compressional waves in the sonic and supersonic ranges.

It is a further object of the invention to provide apparatus whereby so intimate a mixing of fuel with the air is accomplished that a stable mixture is obtained which will not precipitate fuel upon the spark plugs or walls of the combustion cylinders.

Another object of the invention is to provide an apparatus which will break up and disperse the fuel particles to so high a degree that a fuel-air mixture is obtained wherein substantially all of the ultimate fuel particles are surrounded with an envelope of air, so that complete and practically instantaneous, and thus more efficient, combustion upon ignition is attained.

A still further object of the invention is to provide an apparatus which is constructed and arranged to subject a mass of fuel and air directly to forced vibrations emanating from a source of the vibrations located in the midst of the mass of fuel and air.

Still another and important object of the invention is to provide an apparatus for transmitting compressional waves to a flowing mass of air and fuel particles in a direction transverse to the direction of flow.

It is also an object of the invention to provide an arrangement for subjecting a mass of fuel and air to the action of compressional waves in such a manner that a minimum of resistance is presented to the normal flow of the fuel and air.

The invention contemplates further the provision of an apparatus which is capable of producing substantially complete atomization of liquid fuel and intimate mixing thereof with air at all loads of an engine to which the mixture is charged, that is, at all ratios of fuel to air.

Other objects and advantages of the invention will become apparent during the course of the following detailed description of the invention.

According to the present invention a body of air having suspended therein a preliminarily atomized quantity of fuel is subject to the action of sound waves in the sonic or supersonic range in order to cause further break-up of the fuel particles so as to obtain a substantially molecular distribution of the fuel in the body of air. This result is accomplished by subjecting the body of fuel and air to forced vibrations which travel transversely to the direction of movement of the particles, so that the energy of the waves and the energy of flow of the particles combine to produce forces acting on the particles at an angle to each other, thereby favoring continuous disruption of the larger particles. The wave generator or transmitter is preferably in the form of a plate, advantageously of more or less circular form, and extending in a plane parallel to the direction of flow of the fuel, so that a minimum of resistance to flow is presented. The disc is preferably positioned more or less at the middle of the throat of a Venturi tube through which the mixture of air and fuel passes on its way to the intake manifold of an engine. By this arrangement the fuel-air mixture is subjected to the action of the waves at a point where the fuel and air velocity is highest, whereby both further atomization and intimate mixing are promoted. In such region, also, compressional waves emanate from both sides of the vibrating disc and each group of waves acts directly upon substantially half of the mass of fuel and air; hence, the whole mass of fuel and air is acted upon by waves of maximum energy content, substantially no portion of the mixture being acted on only by waves reflected from the walls of the conduit.

In the accompanying drawing, forming a part of this specification, and in which like numerals are employed to designate like parts throughout the same, Figure 1 shows a fragmentary section through a Diesel engine embodying my invention, Figure 2 shows a plan view of an intake manifold and motor block of an internal combustion engine, and, Figure 3 shows a section through the throat of a carburetor embodying my invention.

In Figure 1 of the drawing, wherein for the purpose of illustration, is shown an embodiment of my invention as applied to Diesel engines, the numeral 5 designates the outer cylinder wall having the water jacket 6 and the inner cylinder sleeve 7 with piston 8. The upper part of the cylinder has a direct injection fuel valve 9 with jet 10 for the injection of solid fuel into the cylinder. The vibration exciter disc 12 is operated by rod 13, which is energized by coils 14. The coils 14 are operated by an electric current of the desired frequency generated by the oscillator 15 and connected to the coils 14 by means of wires 16.

In Figure 2 is shown the application of my invention to a gasoline motor with a plurality of cylinders contained in the block 17. The manifold 18 with carburetor 19 has a plurality of vibration exciters 20, which in the present example are shown located in the manifold with one vibration exciter 20 near the intake port of each of the cylinders.

In Figure 3 is illustrated the application of my invention directly to a carburetor schematically illustrated. In the float chamber 21 the fuel 22 supports the float 23 and a tube 24 communicates with jet 25 through which the fuel is drawn by the vacuum created by the engine. The intake of air occurs through the pipe 26 and the necessary pressure drop for the operation of the carburetor is caused by the Venturi tube 27. The oscillator 28 is connected by wires 29 to coils 30, which transmit forced vibrations through rod 31 to disc 32 mounted directly in the throat of the carburetor in a position where it can be directly in contact with the air-fuel mixture. The opening of the upper part of the throat of the carburetor is controlled by the usual butterfly valve 33.

The operation of my invention is as follows:

In the embodiment of my invention shown in Figure 1, the fuel is injected through the valve 9 into the upper cylinder space at the right moment. The high pressure required to inject the fuel will cause an atomization of same which is further advanced by means of the vibrating disc 12 which will cause further atomization of the injected fuel vapor with the compressed air in the cylinder. It will be noted that the disc 12 extends parallel to the direction of flow of the fuel injected by the valve 9 but that the compressional waves set up by the disc 12 travel transversely to the fuel jet. Thereby optimum conditions are created for the further break-up of the fuel particles. The disc 12 is spaced from the adjacent inner surface of the cylinder head and in consequence vibrations are set up in both directions with the disc 12 as a starting point.

In the application of my invention shown in Figure 2, the vibration exciters 20 have been placed directly in front of the intake ports leading from the manifold 18 to the various cylinders. In this manner every particle of the air-fuel mixture can be thoroughly vibrated and mixed and a precipitation of the fuel on the walls of the manifold may be prevented. This will greatly reduce the losses in the manifold due to rough surfaces, etc., and it will also facilitate starting in cold weather.

In reference to the embodiment of my invention shown in Figure 3, the operation of the invention is obvious from the description given supra. The vibrating disc 32 will act directly upon the column of air-fuel mixture created in the throat of the carburetor and will set same into violent forced vibrations. As mentioned above these vibrations which involve rapidly recurring pressure changes, will tear up the droplets or other groupings of fuel molecules and will distribute same in an even and homogeneous pattern among the air molecules. In this manner an intimate atomization of the hydrocarbon molecules of the fuel with the oxygen and nitrogen molecules of the air is accomplished whereby the oxygen of the air is evenly distributed around the hydrocarbon molecules thereby making a more complete combustion possible and also making a more stable atomization.

As in the embodiment illustrated in Fig. 1, the disc 32 extends in a direction parallel to the flow of the fuel, so that the resistance to flow is maintained at a minimum. The disc is located in a region of high or maximum velocity, so that the disruptive forces created both by the flow and by the compressional waves are practically at a maximum, it being noted that the direction of the waves is transverse to the direction of flow of the fuel. The disc 32 is arranged more or less along the longitudinal axis of the Venturi tube 27 so that substantially equal bodies of fuel and air are acted upon by the waves emanating from the two sides of the disc. As will be obvious, the bushing through which the rod or stem of the disc passes will be of such nature as to permit the longitudinal vibrations of the rod without any considerable damping.

It is to be understood that the form of my invention, herewith shown and described, is to be taken as a preferred example of the same and that various changes in the shape, size, and arrangement of parts may be resorted to, without departing from the spirit of my invention or the scope of the subjoined claims.

Having thus described my invention I claim:

1. Process for intimately mixing a stream of atomized liquid fuel with air which comprises generating trains of compressional waves within the body of fuel and air travelling in opposite directions from a region within such body of fuel and air and transversely to the direction of flow of the stream of fuel, whereby all portions of the mixtures of fuel and air are subjected directly to the action of waves emanating from the source of the waves.

2. Process for intimately mixing a stream of atomized liquid fuel with air which comprises accelerating the air and fuel particles in the same direction and generating, approximately in the region of maximum velocity, compressional waves within the flowing body of fuel and air and travelling transversely to the direction of flow of said fuel and air, said region of generation of the compressional waves being approximately in the center of the stream of fuel and air.

3. Process for intimately mixing a stream of atomized liquid fuel with air which comprises accelerating the air and fuel particles in the same direction and generating, approximately in the region of maximum velocity, compressional waves within the flowing body of fuel and air and travelling transversely to the direction of flow of said fuel and air, said waves being generated in the form of oppositely travelling trains of waves emanating from the source of the waves.

4. Process according to claim 3 wherein the frequency of the waves is in the audible range.

5. Process according to claim 3 wherein the frequency of the waves is in the supersonic range.

6. Apparatus for intimately mixing air and atomized fuel particles, comprising means for directing a stream of atomized fuel into a body of air, and means for generating in the mass of fuel and air trains of compressional waves travelling in opposite directions and transversely to the direction of flow of the stream of fuel.

7. Apparatus for intimately mixing air and atomized fuel particles, comprising means for directing a stream of atomized fuel into a body of air, a plate-like member arranged within the body of atomized fuel and air and extending in a plane substantially parallel to the direction of flow of the stream of fuel, and means for setting said plate-like member into transverse vibration to generate within the body of air and fuel trains of compressional waves travelling transversely to the direction of said stream of fuel.

8. Apparatus for intimately mixing air and atomized fuel particles, comprising a Venturi tube, an air conduit connected with said tube, a fuel nozzle arranged to direct a stream of atomized fuel into the Venturi tube, and means arranged within the Venturi tube and operable to set up compressional waves within the mixture of fuel and air in a direction transverse to the axis of the tube.

9. Apparatus for intimately mixing air and atomized fuel particles, comprising a Venturi tube, an air conduit connected with said tube, a fuel nozzle arranged to direct a stream of atomized fuel into the Venturi tube, a plate-like member arranged within the tube and extending in a plane parallel to the axis of the tube, and means for setting said member into transverse vibration to cause it to generate trains of compressional waves in the body of fuel and air and travelling transversely to the direction of travel of the latter.

10. Apparatus according to claim 9 wherein the plate-like member is arranged substantially along the longitudinal axis of the Venturi tube.

11. Apparatus according to claim 9 wherein the means for setting the plate-like member into vibration comprises a stem connected to the member, and mechanism including an electric oscillator for vibrating said stem longitudinally.

ALFRED VANG.